United States Patent
Youn et al.

(10) Patent No.: US 12,547,230 B1
(45) Date of Patent: Feb. 10, 2026

(54) CHARGING APPARATUS FOR SMART WATCHES

(71) Applicant: SPIGEN KOREA CO., LTD., Seoul (KR)

(72) Inventors: Junyong Youn, Seoul (KR); Youngsuk Ko, Bucheon-si (KR)

(73) Assignee: SPIGEN KOREA CO., LTD., Seoul (KR)

( * ) Notice: Subject to any disclaimer, the term of this patent is extended or adjusted under 35 U.S.C. 154(b) by 0 days.

(21) Appl. No.: 19/218,751

(22) Filed: May 27, 2025

(51) Int. Cl.
| | |
|---|---|
| G06F 1/26 | (2006.01) |
| G04G 17/08 | (2006.01) |
| G06F 1/16 | (2006.01) |
| H02J 7/00 | (2006.01) |

(52) U.S. Cl.
CPC .............. G06F 1/26 (2013.01); G04G 17/08 (2013.01); G06F 1/1629 (2025.01); G06F 1/163 (2013.01); H02J 7/0044 (2013.01); H02J 2207/30 (2020.01)

(58) Field of Classification Search
CPC .......... G06F 1/26; G06F 1/1629; G06F 1/163; G04G 17/08; H02J 7/0044; H02J 2207/30
USPC ....................................................... 320/107
See application file for complete search history.

(56) References Cited

U.S. PATENT DOCUMENTS

| | | | | |
|---|---|---|---|---|
| 9,247,795 | B2 * | 2/2016 | Kim ..................... | B65D 81/022 |
| 9,581,972 | B1 * | 2/2017 | Arrow ................... | G04G 21/00 |
| 9,768,638 | B2 * | 9/2017 | Kim ..................... | H02J 7/0047 |
| 9,836,086 | B2 * | 12/2017 | Suckle .................. | G06F 1/1632 |
| 10,367,367 | B1 * | 7/2019 | Jacobs ................... | H02J 50/10 |
| 10,491,041 | B2 * | 11/2019 | Wittenberg ........ | H01Q 21/0093 |
| 10,847,993 | B2 * | 11/2020 | Thelusma ............... | G04C 10/02 |
| 10,951,043 | B2 * | 3/2021 | Behzadi .................... | G06F 1/28 |
| 11,114,871 | B2 * | 9/2021 | Zhan ......................... | H02J 7/00 |
| 12,068,612 | B2 * | 8/2024 | Lee ........................ | G06F 1/1632 |
| 2012/0262116 | A1 * | 10/2012 | Ferber .................. | H02J 7/0044 |
| | | | | 429/163 |
| 2016/0062319 | A1 * | 3/2016 | Kim ....................... | G04C 10/00 |
| | | | | 368/204 |
| 2017/0331508 | A1 | 11/2017 | Kim | |
| 2020/0266655 | A1 * | 8/2020 | Thelusma .............. | G04C 10/02 |
| 2020/0280199 | A1 * | 9/2020 | Lopotko ............... | H02J 7/0044 |

(Continued)

FOREIGN PATENT DOCUMENTS

| | | | | |
|---|---|---|---|---|
| CN | 109217036 | A | 1/2019 | |
| CN | 212878005 | U * | 4/2021 | ............... H02J 7/00 |

(Continued)

OTHER PUBLICATIONS

KR20160109190A to Park (Machine Translation) (Year: 2016).*
WO 2016173417 A1 to Yang (Machine Translation) (Year: 2016).*

*Primary Examiner* — M Baye Diao
(74) *Attorney, Agent, or Firm* — Bridgeway IP Law Group, PLLC; Jihun Kim

(57) ABSTRACT

Devices and products for charging smart watches are described. According to one embodiment, a charging stand apparatus for charging a smart watch enclosed in a protective cover comprises a housing and at least one extension connector to electrically couple with at least one connector of a low power charging system for charging the smart watch at a first end of the at least one extension connector and to electrically couple with at least one side connector of a rechargeable battery unit of the smart watch formed on a case of the smart watch at a second end of the at least one extension connector opposite to the first end.

18 Claims, 17 Drawing Sheets

(56) References Cited

U.S. PATENT DOCUMENTS

| | | | | |
|---|---|---|---|---|
| 2021/0120981 A1* | 4/2021 | Lavoie | ............. | A47F 7/022 |
| 2022/0360097 A1* | 11/2022 | Sepänniitty | ......... | H02J 7/0044 |
| 2023/0361587 A1* | 11/2023 | Nam | ............. | A61B 5/6826 |
| 2023/0376098 A1* | 11/2023 | Lin | ............. | G06F 1/26 |

FOREIGN PATENT DOCUMENTS

| | | | | | |
|---|---|---|---|---|---|
| CN | 216390558 U | * | 4/2022 | | |
| CN | 221008146 U | | 5/2024 | | |
| KR | 20160109190 A | * | 9/2016 | ............ | H02J 7/0044 |
| TW | M529866 U | * | 10/2016 | | |
| WO | WO-2016173417 A1 | * | 11/2016 | ................ | H02J 7/00 |

* cited by examiner

CHARGING APPARATUS FOR SMART WATCHES

FIELD

The present disclosure relates to charging apparatus, more particularly to charging stand apparatus, protective charging cases and charging apparatus for smart watches.

BACKGROUND

Wired magnetic charging using a USB-C cable typically involves a USB-C connector on one end of the cable and a magnetic connector at the other end, which connects to a device being charged. This magnetic connection allows for easy attachment and detachment, and the USB-C end is connected to a power source. The USB-C connector on one end of the cable may be a standard USB-C connector that plugs into a USB-C port on an adapter or computer. The other end of the cable may be a magnetic connector designed to attach to a corresponding magnetic receiver on the device being charged. Once the magnetic connector is attached to the device, the USB-C cable provides power from the power source to the device via the USB-C connector.

FIG. 1 is a perspective view of charging a smart watch using a conventional USB-C magnetic charging system. For example, the smart watch may be a Google Pixel Watch 3® 102. As illustrated in FIG. 1, the Google Pixel Watch 3® 102 stores power using a built-in, rechargeable lithium-ion battery. This type of battery is commonly used in portable devices for its high energy density and ability to be recharged. The Google Pixel Watch 3® uses a USB-C magnetic charging cable to charge its built-in, rechargeable lithium-ion battery. The cable uses a magnetic pin-based system to deliver power (e.g., from a compatible power adapter with power ranging from 5 Watt and 30 Watt or a powered USB-C port on a computer or hub) to it. The charging cable features a circular dock 104 with four metal pins (not shown) which align with four corresponding contacts 106 on the back of the Google Pixel Watch 3® 102.

Once the smart watch is placed on the dock 104 of the charger, magnets in the dock 104 snap it into place, ensuring a secure connection between the pins and the contacts 106 of the Google Pixel Watch 3® 102.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

The present disclosure includes multiple embodiments of low power charging apparatus for charging smart watches in protective cases or covers.

According to one embodiment, a charging stand apparatus for charging a smart watch enclosed in a protective cover comprises a housing and at least one extension connector to electrically couple with at least one connector of a low power charging system for charging the smart watch at a first end of the at least one extension connector and to electrically couple with at least one side connector of a rechargeable battery unit of the smart watch formed on a case of the smart watch at a second end of the at least one extension connector opposite to the first end.

According to another embodiment, a protective charging case for smart watch comprises a protective case of the smart watch, a protrusion portion integrally formed on the protective case of the smart watch and at least one extension connector formed in the protrusion portion to electrically couple with at least one connector of a low power charging system for charging the smart watch at a first end of the at least one extension connector and to electrically couple with at least one side connector of a rechargeable battery unit of the smart watch at a second end of the at least one extension connector opposite to the first end.

According to yet another embodiment, a charging apparatus for charging a smart watch enclosed in a protective cover comprises a housing, a low power charging system and at least one electrical contact formed on top of the housing to electrically couple with the low power charging system for charging the smart watch and to electrically couple with at least one side connector of a rechargeable battery unit of the smart watch formed on a case of the smart watch during the charging.

BRIEF DESCRIPTION OF THE FIGURES

Example embodiments are illustrated by way of example and not limitation in the figures of the accompanying drawings, in which like references indicate similar elements and in which.

Other features of the present embodiments will be apparent from the accompanying drawings and from the detailed description that follows.

DETAILED DESCRIPTION

Reference will now be made in detail to the preferred embodiments of the disclosure, examples of which are illustrated in the accompanying drawings. While the disclosure will be described in conjunction with the preferred embodiments, it will be understood that they are not intended to limit the disclosure to these embodiments. On the contrary, the disclosure is intended to cover alternatives, modifications and equivalents, which may be included within the spirit and scope of the disclosure as defined by the claims. Furthermore, in the detailed description of the present disclosure, numerous specific details are set forth in order to provide a thorough understanding of the present disclosure. However, it will be obvious to one of ordinary skill in the art that the present disclosure may be practiced without these specific details. In other instances, well known methods, procedures, components, and circuits have not been described in detail as not to unnecessarily obscure embodiments of the present disclosure.

Figure 1:
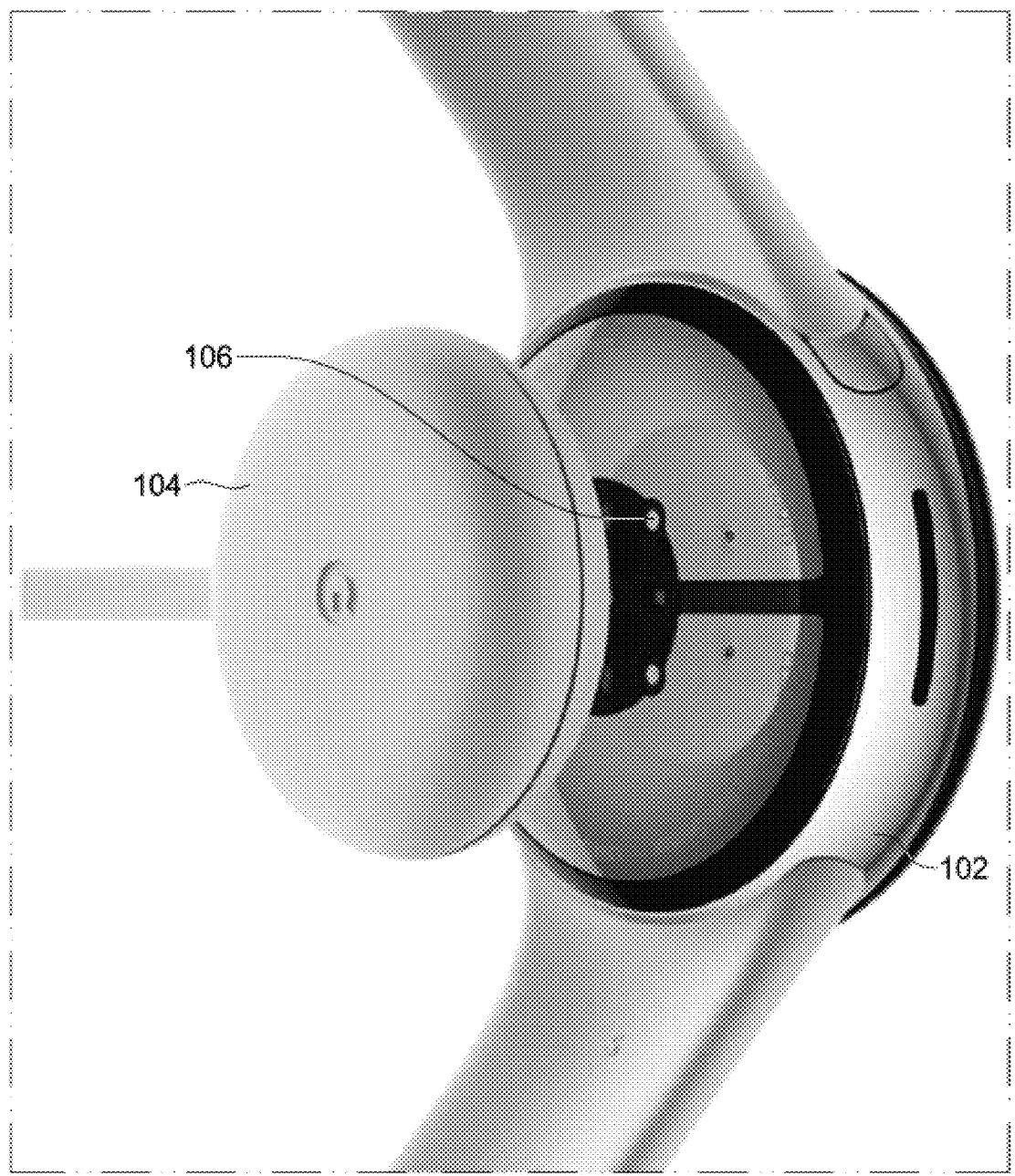
FIG. 1 is a perspective view of charging a smart watch using a conventional USB-C magnetic charging system.

The present disclosure is directed to charging smart watches based on a low power charging system with convenient transfer of power. With the proliferation of mobile electrical and electronic devices, simple and universal methods of providing power and/or charging of these devices is becoming increasingly important. For example, as illustrated in FIG. 1, the Google Pixel Watch 3® 102 uses the USB-C magnetic charging cable to charge its built-in, rechargeable lithium-ion battery, where the cable uses the magnetic pin-based system to deliver power to it. The charging cable features the circular dock 104 with four metal pins (not shown) which align with the four corresponding contacts 106 on the back of the watch, thus ensuring a secure connection between the pins and the contacts 106 of the watch.

Figure 2A:
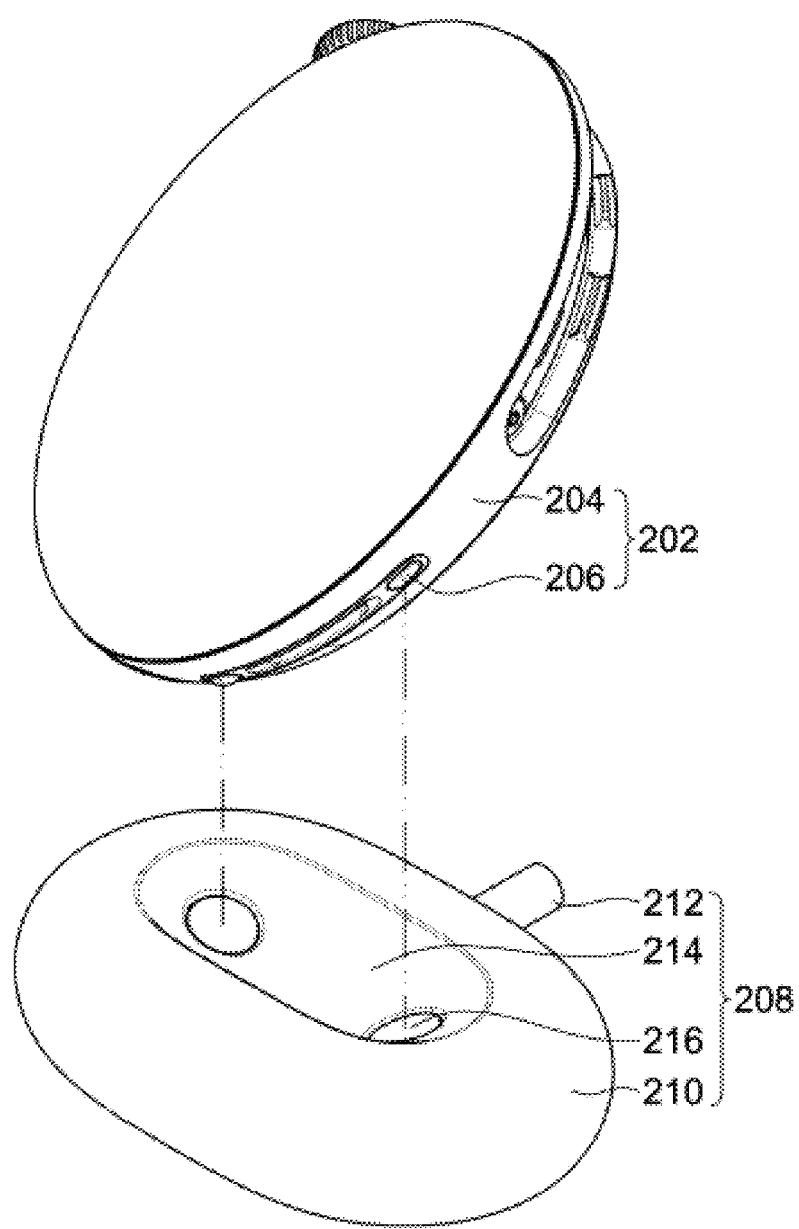
FIGS. 2A and 2B illustrate perspective views of a low power charging system for charging a smart watch.
Figure 2B:
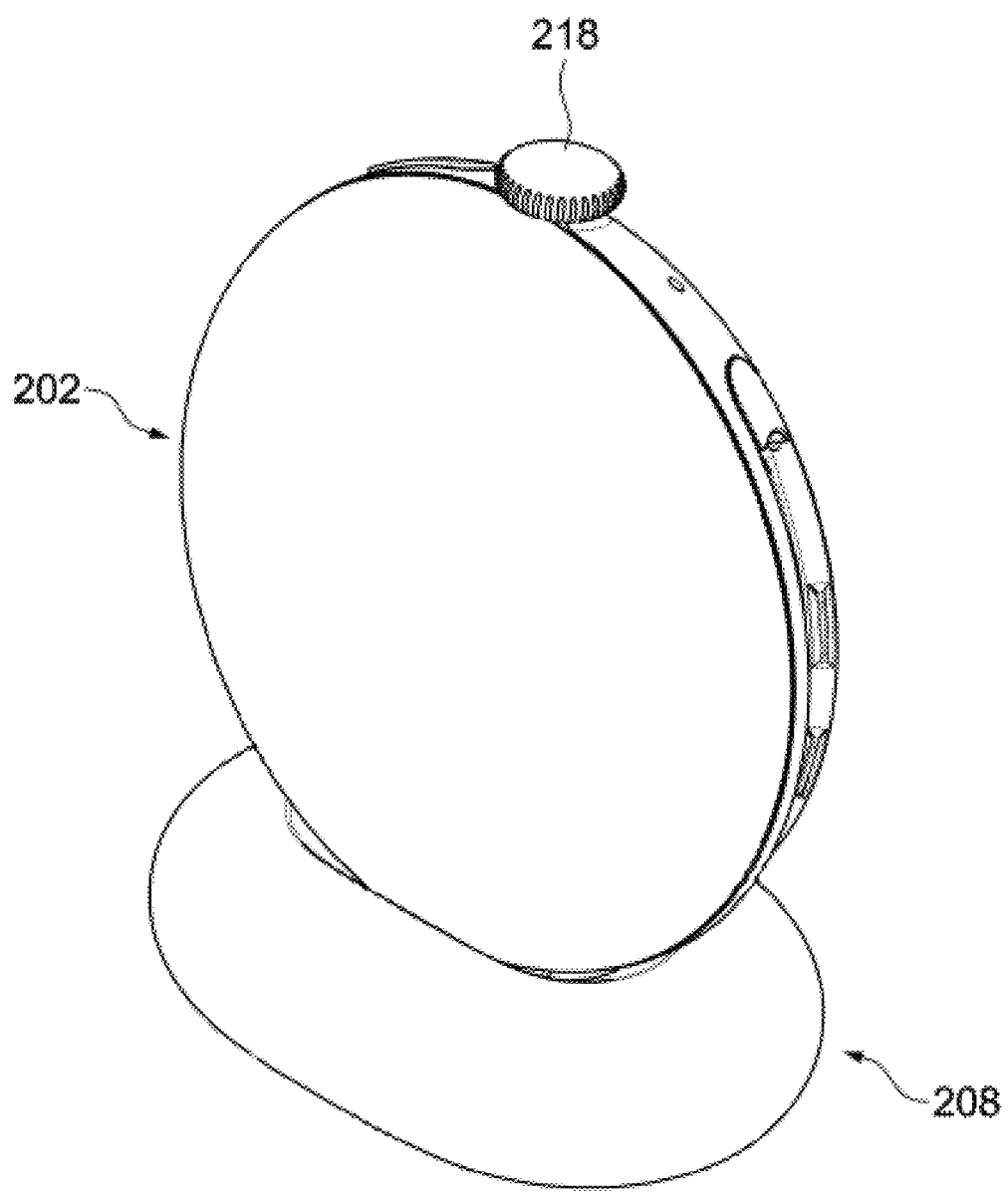

The maker of such watches may choose to design its charging system different from the current system, as illustrated in FIGS. 2A and 2B. That is, instead of using the circular dock 104 of FIG. 1, a low power charging system 208 (or a low power charger or a low power charging cable) may be provided to couple with a smart watch 202. It is appreciated that the low-power charging system may use less energy to recharge a device or battery, often targeting smaller devices. The low power charging system may deliver less energy to the device, typically resulting in slower charging times. The low power charging system may be used for charging devices, such as smart watches, cell phones, portable devices, and some computers, which typically charge at power levels below 100 watts. It is appreciated that the low power charging system 208 (or the low power charger or the low power charging cable) may be a charging system based on a universal serial bus Type A or USB-A, USB-B, USB-C, Mini-USB, Micro-USB, USB-3, etc.

As illustrated in FIG. 2A, the low power charging system 208 comprises a casing 210, an indentation 214 formed on top of the casing and a cable 212 (e.g., a USB-C magnetic fast charging cable), where at least one connector 216 of the low power charging system 208 is formed in the indentation 214.

The smart watch 202 comprises a case 204 and at least one side connector 206 (e.g., two) formed on the case 204 to align and electrically contact with the at least one connector 216 of the low power charging system 208. The at least one side connector 206 of the smart watch 202 is formed on the case 204, which may be opposite to the position of a crown 218 of the smart watch 202. During a charging of the smart watch 202, a built-in, rechargeable lithium-ion battery (not shown) of the smart watch 202 may be charged through the at least one side connector 206 when the at least one side connector 206 of the smart watch 202 is aligned and electrically coupled with the at least one connector 216 of the low power charging system 208. It is appreciated that a rechargeable sodium-ion battery may be used in place of the rechargeable lithium-ion battery.

During the charging of the smart watch 202, the smart watch 202 may be placed on or inserted into the indentation 214, as illustrated in FIG. 2B, where the width of the indentation 214 may be slightly bigger than the thickness of the smart watch 202. During the operation, the smart watch 202, supported by the magnetic pull of the low power charging system 208 which may be similar to that of the circular dock 104 of FIG. 1, may be able to stand upright. However, it may be difficult to place the smart watch into the indentation 214 when it is thickened by a protective case or cover worn by it. That is, the protective cover may hamper a secure connection between the connector(s) 216 of the low power charging system 208 and the side connector(s) 206 of the smart watch 202. As a result, the at least one side connector 206 of the smart watch 202 may not be electrically coupled with the at least one connector 216 of the low power charging system 208, thus hindering the charging of the smart watch 202.

To deal with such issues, embodiments of the present disclosure propose charging apparatus for smart watches which achieve a secure electrical connection between the smart watch 202 enclosed in a protective case and the low power charging system 208.

Figure 3A:
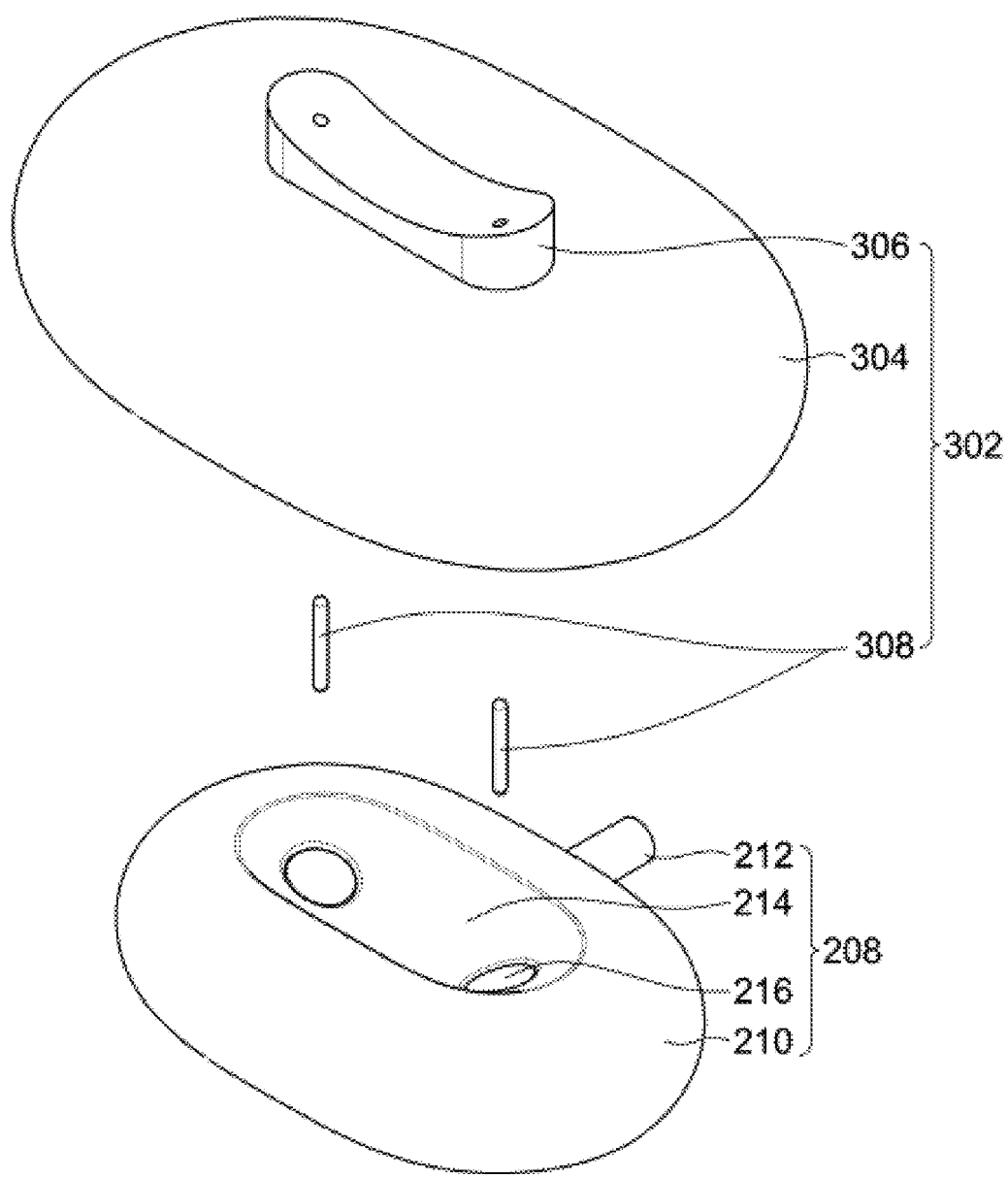
FIG. 3A illustrates a simple exploded view of a charging stand apparatus interacting with the low power charging system of FIGS. 2A and 2B, according to one embodiment of the present disclosure.

FIG. 3A illustrates a simple exploded view of a charging stand apparatus 302 interacting with the low power charging system 208 of FIGS. 2A and 2B, according to one embodiment of the present disclosure. In FIG. 3A, the charging stand apparatus 302 comprises a housing 304, a protrusion 306 and one or more extension connectors 308 (e.g., two extension connectors). It is appreciated that the one or more extension connectors 308, which are made of an electrical conductor, may facilitate transmission of data, power, or both between the smart watch 202 and the low power charging system 208. The protrusion 306 is formed on the housing 304 of the charging stand apparatus 302 to secure an electrical connection with the one or more connectors 216 of the low power charging system 208.

Figure 3B:
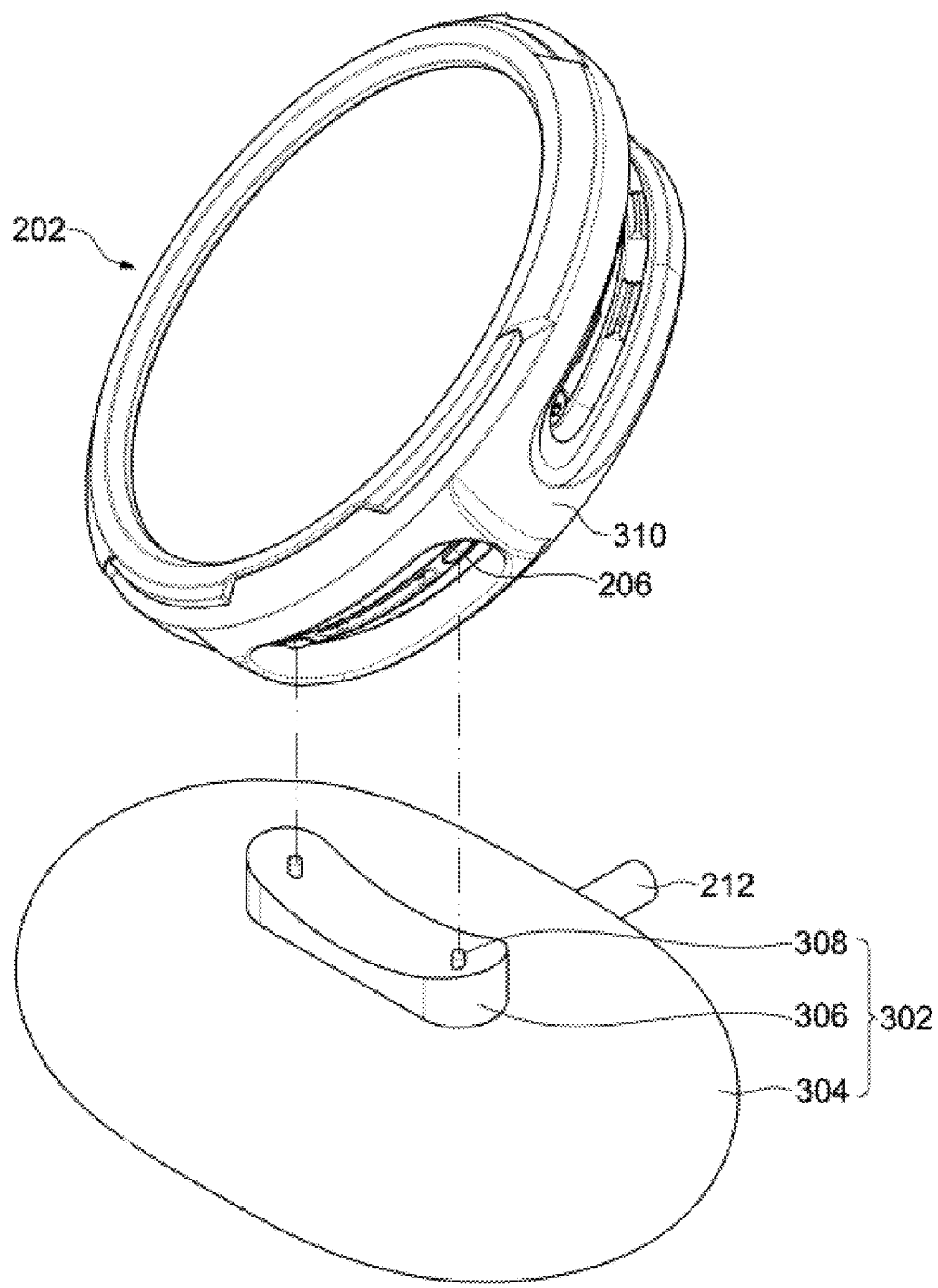
FIGS. 3B and 3C illustrate perspective views of the charging stand apparatus of FIG. 3A engaging with the smart watch of FIGS. 2A and 2B enclosed in a protective cover for charging, according to one embodiment of the present disclosure.
Figure 3C:
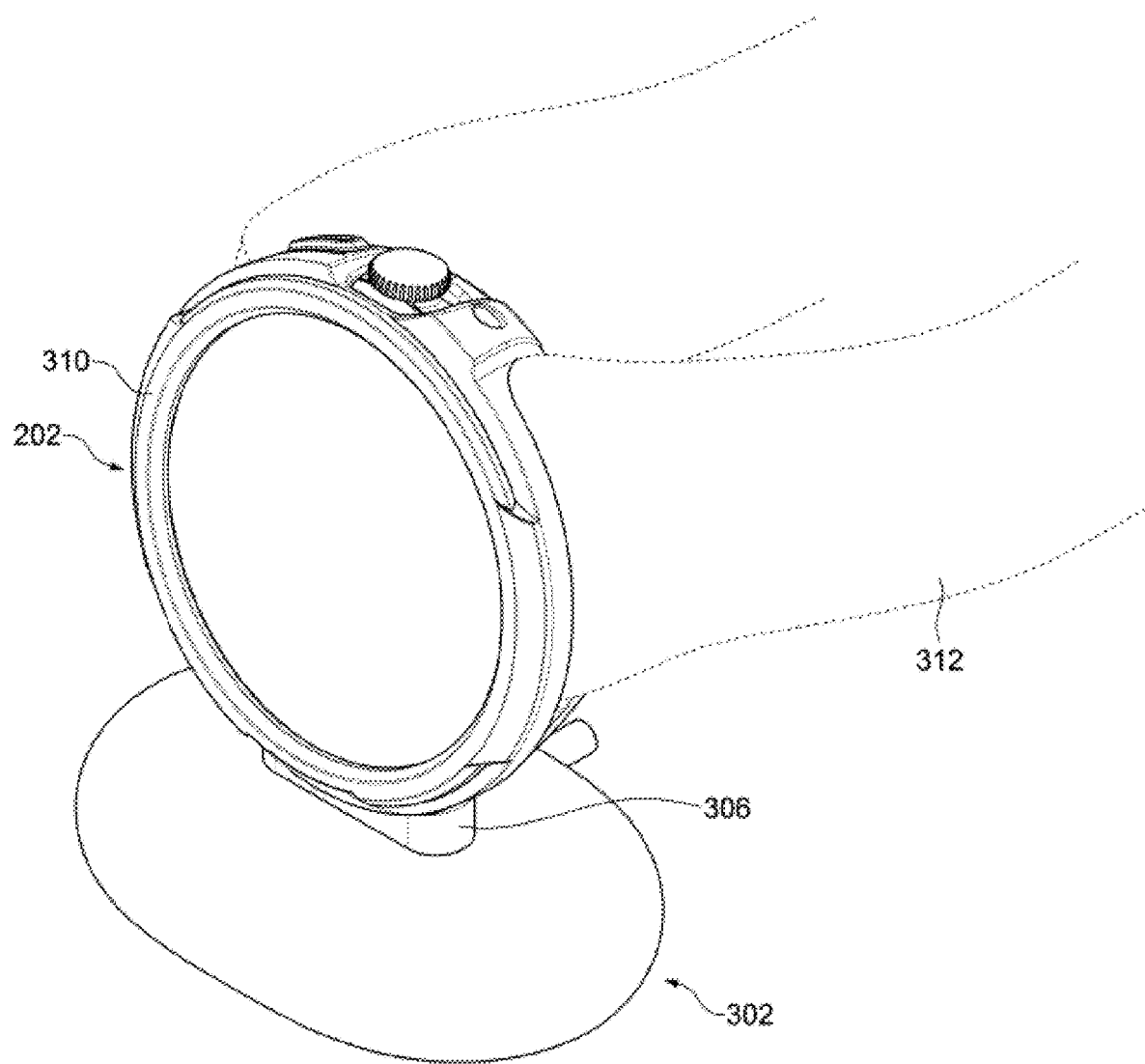

Additionally, FIGS. 3B and 3C illustrate perspective views of the charging stand apparatus 302 of FIG. 3A engaging with the smart watch 202 of FIGS. 2A and 2B enclosed in a protective case 310 for charging, according to one embodiment of the present disclosure. Accordingly, the one or more extension connectors 308 are electrically coupled with the one or more connectors 216 of the low power charging system 208 for charging the smart watch 202 at one end. In addition, the one or more extension connectors 308 are electrically coupled with the one or more side connectors 206 of a rechargeable battery unit of the smart watch 202 formed on the case 204 of the smart watch 202 at the other end of the extension connectors 308.

In one embodiment, the protrusion 306 is formed on a top surface of the housing 304, where the extension connectors 308 are fastened within the protrusion 306. In one embodiment, the extension connectors 308 comprise two extension connectors. As illustrated in FIG. 2, the one or more side connectors 206 may be formed on the case 204 of the smart watch 202, which is opposite to the crown 218 of the smart watch 202. In one embodiment, the extension connectors 308 comprise a pogo pin. As illustrated in FIG. 3C, the smart watch 202, equipped with a watch strap 312, may be stably placed on the charging stand apparatus 302 during the charging as the side connectors 206 of the smart watch 202 are electrically coupled with the extension connectors 308 of the charging stand apparatus 302.

Figure 4:
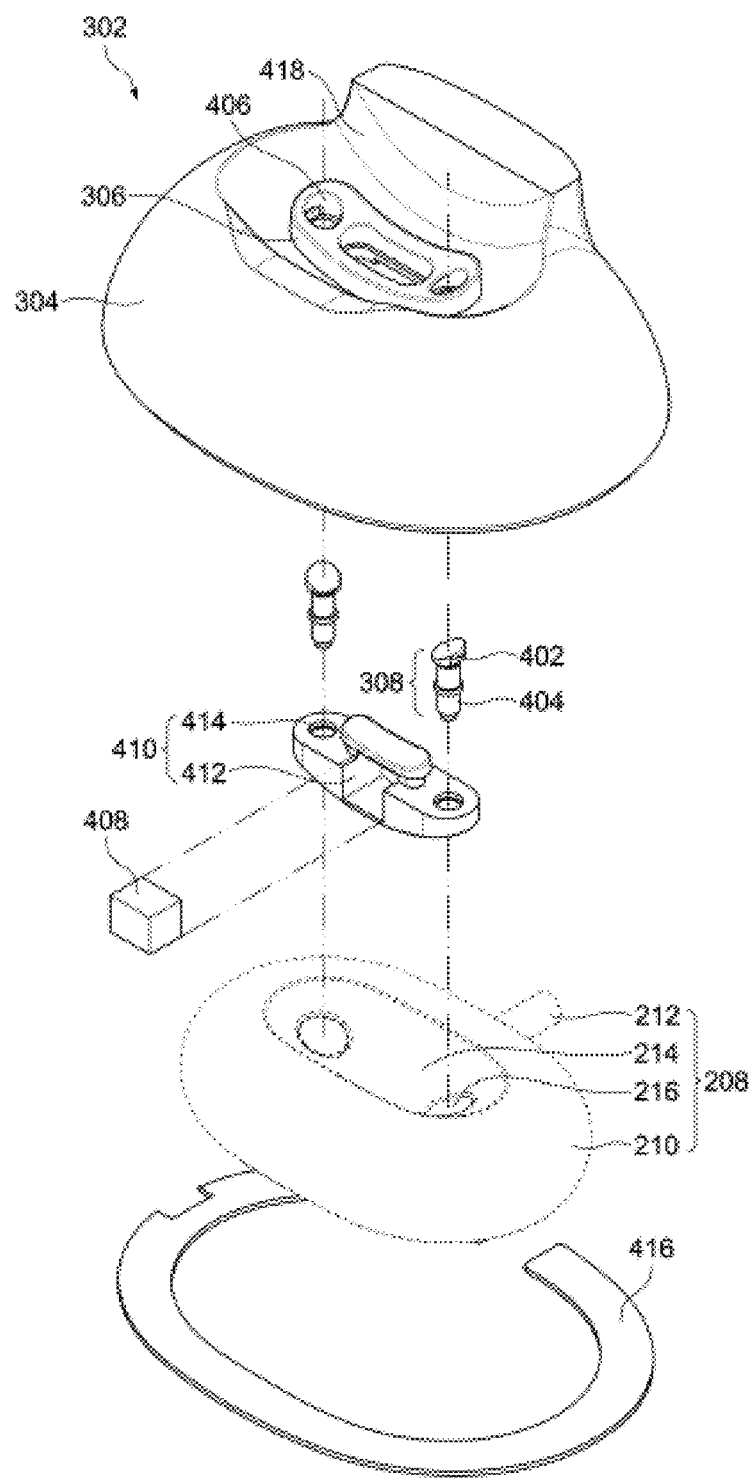
FIG. 4 illustrates a detailed exploded view of the charging stand apparatus of FIGS. 3A, 3B and 3C configured to electrically couple with the low power charging system of FIGS. 2A and 2B, according to one embodiment of the present disclosure.

FIG. 4 illustrates a detailed exploded view of the charging stand apparatus 302 of FIGS. 3A, 3B and 3C configured to electrically couple with the low power charging system 208 of FIGS. 2A and 2B, according to one embodiment of the present disclosure. According to one embodiment, the charging stand apparatus 302 for charging the smart watch 202 enclosed in the protective case 310 comprises the housing 304 and the at least one extension connector 308 to electrically couple with the at least one connector 216 of the low power charging system 208 for charging the smart watch 202 at a first end (e.g., the tail end of a pogo pin 404) of the at least one extension connector 308. The at least one extension connector 308 is also electrically coupled with the at least one side connector 206 of the rechargeable battery unit of the smart watch 202 formed on the case 204 of the smart watch 202 at a second end (e.g., a contact surface 402) of the at least one extension connector 308 opposite to the first end.

According to one embodiment, the charging stand apparatus 302 further comprises the protrusion 306 formed on the top surface of the housing 304, where the second end of the at least one extension connector 308 is exposed and/or formed on the protrusion 306. Moreover, the charging stand apparatus 302 comprises a vertical support 418 formed on a periphery of the housing 304 to support the smart watch 202 during the charging. In one example embodiment, the vertical support 418 is formed on the top surface of the housing 304 toward the back thereof. In one embodiment, the top surface of the housing 304 is of a concave shape.

In addition, the charging stand apparatus 302 comprises a magnet 408 (e.g., or a ferromagnetic material, such as steel) placed underneath the protrusion 306 to magnetically attract the at least one side connector 206 of the rechargeable battery unit of the smart watch 202 toward the at least one extension connector 308. It is appreciated that the magnet 408 may magnetically align and attach the at least one side connector 206 of the smart watch 202 to the at least one extension connector 308 of the charging stand apparatus 302 and to the at least one connector 216 of the low power charging system 208 for power and/or data connection. The charging stand apparatus 302 further comprises a nut unit 410 which includes a depression 412 formed at a center of the nut unit 410 configured to accommodate the magnet 408 and at least one hole 414 formed on at least one side of the nut unit 410 through which the at least one extension connector 308 penetrates to couple with the at least one side connector 206 of the smart watch 202 and the at least one connector 216 of the low power charging system 208.

In one example embodiment, the at least one extension connector 308 is a pogo pin in one body. Alternatively, the at least one extension connector comprises the contract surface 402 for providing a stable contact with the at least one side connector 206 of the smart watch 202 and the pogo pin 404 coupled to the contact surface 402, where the tail end of the pogo pin is coupled with the at least one connector 216 of the low power charging system 208. In another example embodiment, the charging stand apparatus 302 comprises an anti-slip pad 416 formed at a bottom of the charging stand apparatus 302. As illustrated in FIG. 4, the charging stand apparatus 302 comprises a space formed within the housing 304 to enclose or accommodate the low power charging system 208, where the low power charging system 208 is conveniently detached from the charging stand apparatus 302 based on the user's need. For instance, the low power charging system 208 may be detached from the charging stand apparatus 302 and may be used to charge the smart watch 202 without the protective case 310, as illustrated in FIGS. 2A and 2B. Conversely, the low power charging system 208 may be attached and/or kept within the charging stand apparatus 302 when the user prefers charging the smart watch 202 enclosed in the protective case 310.

Figure 5:
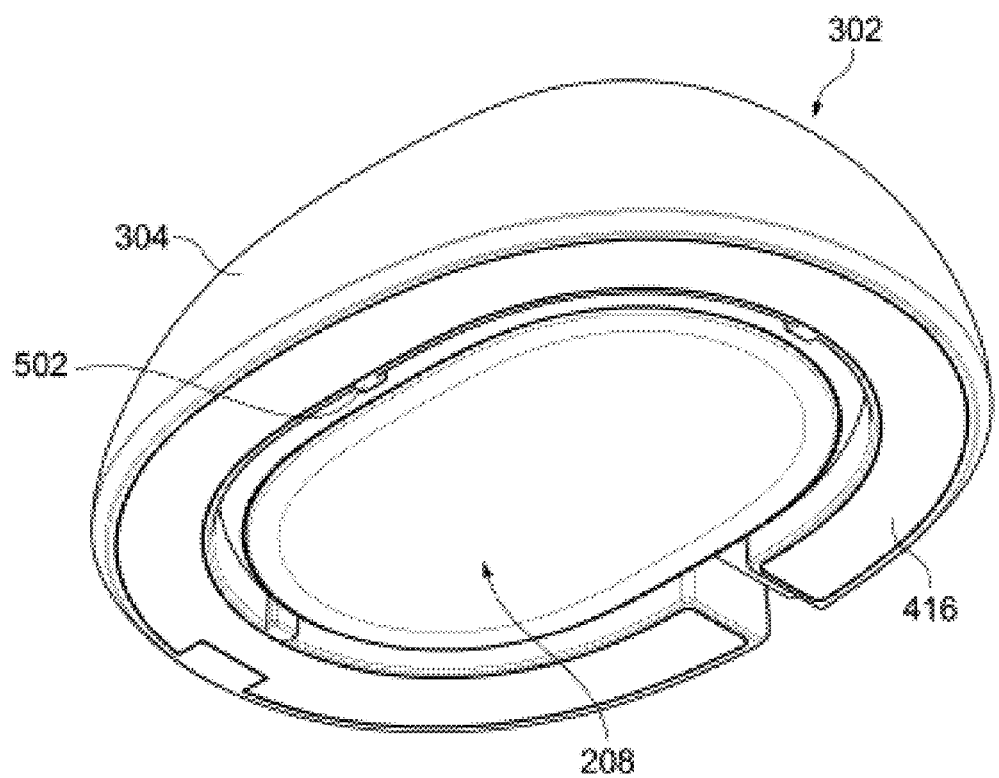
FIG. 5 illustrates a bottom perspective view of the charging stand apparatus of FIGS. 3A, 3B and 3C configured to accommodate the low power charging system of FIGS. 2A and 2B, according to one embodiment of the present disclosure.

FIG. 5 illustrates a bottom perspective view of the charging stand apparatus 302 of FIGS. 3A, 3B and 3C configured to accommodate the low power charging system 208 of FIGS. 2A and 2B, according to one embodiment of the present disclosure. In FIG. 5, the low power charging system 208 is securely enclosed in the charging stand apparatus 302 using a number of hooks 502 or holders when the low power charging system 208 is inserted into an empty space in the housing 304 reserved for the system. Further, the anti-slip pad 416 is provided at the bottom of the charging stand apparatus 302 to prevent the apparatus from slipping.

Figure 6A:
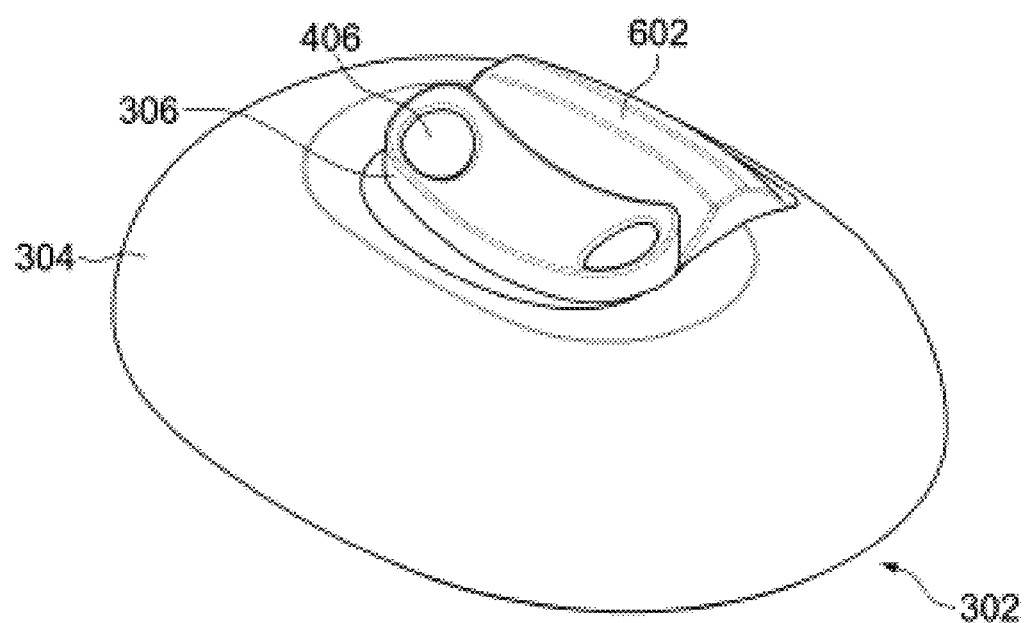
FIGS. 6A and 6B illustrate perspective views of the charging stand apparatus of FIGS. 3A, 3B and 3C with a vertical support formed on its housing to support the smart watch of FIGS. 2A and 2B enclosed in the protective cover for charging thereof, according to one embodiment of the present disclosure.
Figure 6B:
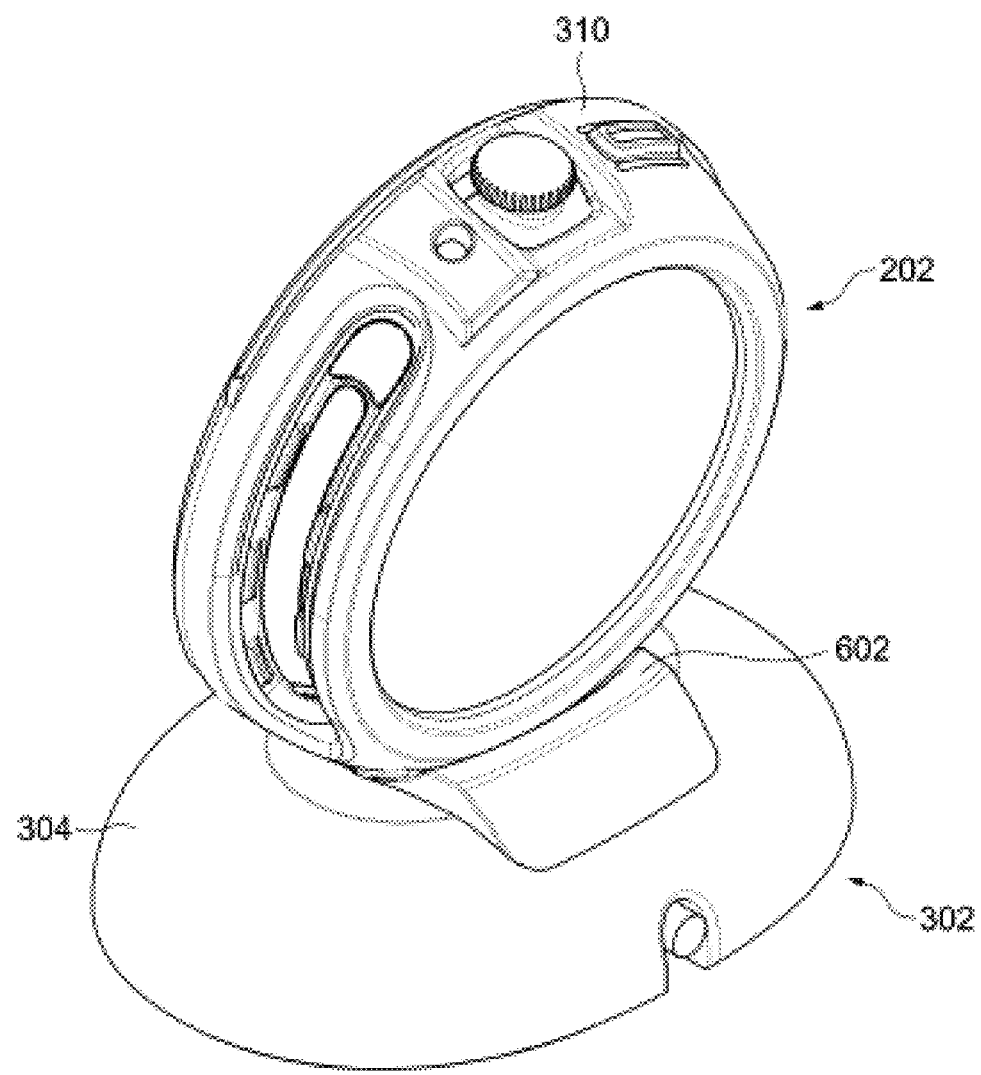

FIGS. 6A and 6B illustrate perspective views of the charging stand apparatus 302 of FIGS. 3A, 3B and 3C with a vertical support 602 formed on its housing 304 to support the smart watch 202 of FIGS. 2A and 2B enclosed in the protective case 310 for charging thereof, according to one embodiment of the present disclosure. According to one embodiment, as illustrated in FIGS. 6A and 6B, the vertical support 602 of a moderate height is formed to support the smart watch 202 during its charging. That is, the vertical support 602 may be used to prevent the smart watch 202 from falling off the charging stand apparatus 302 when the smart watch 202 enclosed in the protective case 310 stands on the charging stand apparatus 302 during the charging operation.

Figure 7A:
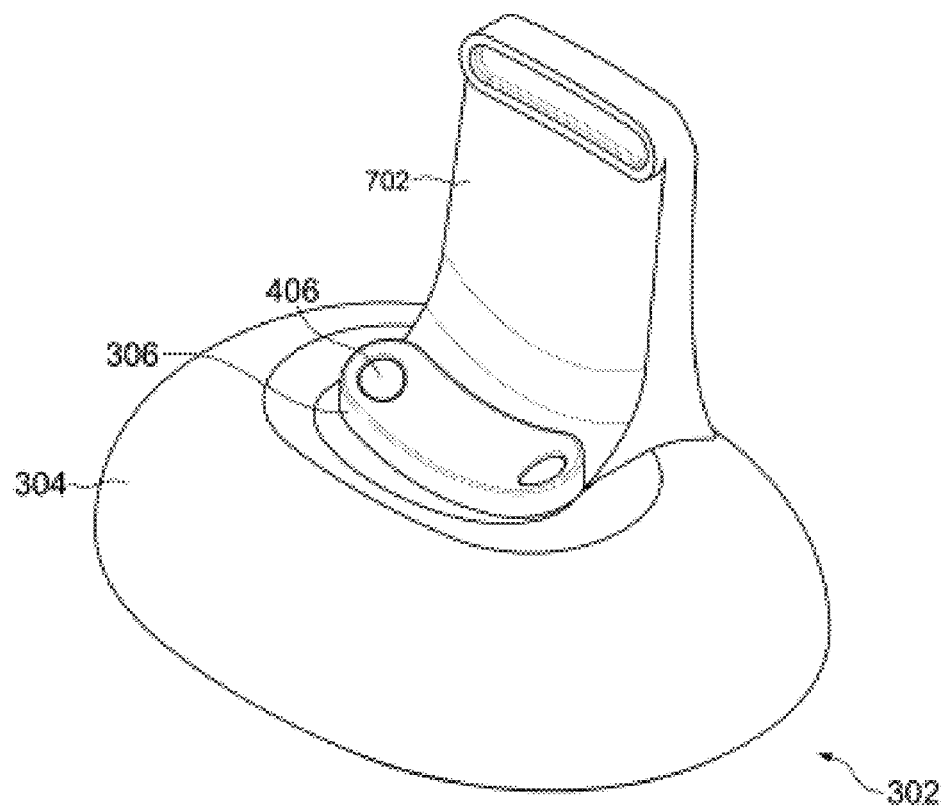
FIGS. 7A and 7B illustrate perspective views of the charging stand apparatus of FIGS. 3A, 3B and 3C with another vertical support formed on its housing to support the smart watch of FIGS. 2A and 2B enclosed in the protective cover for charging thereof, according to one embodiment of the present disclosure.
Figure 7B:
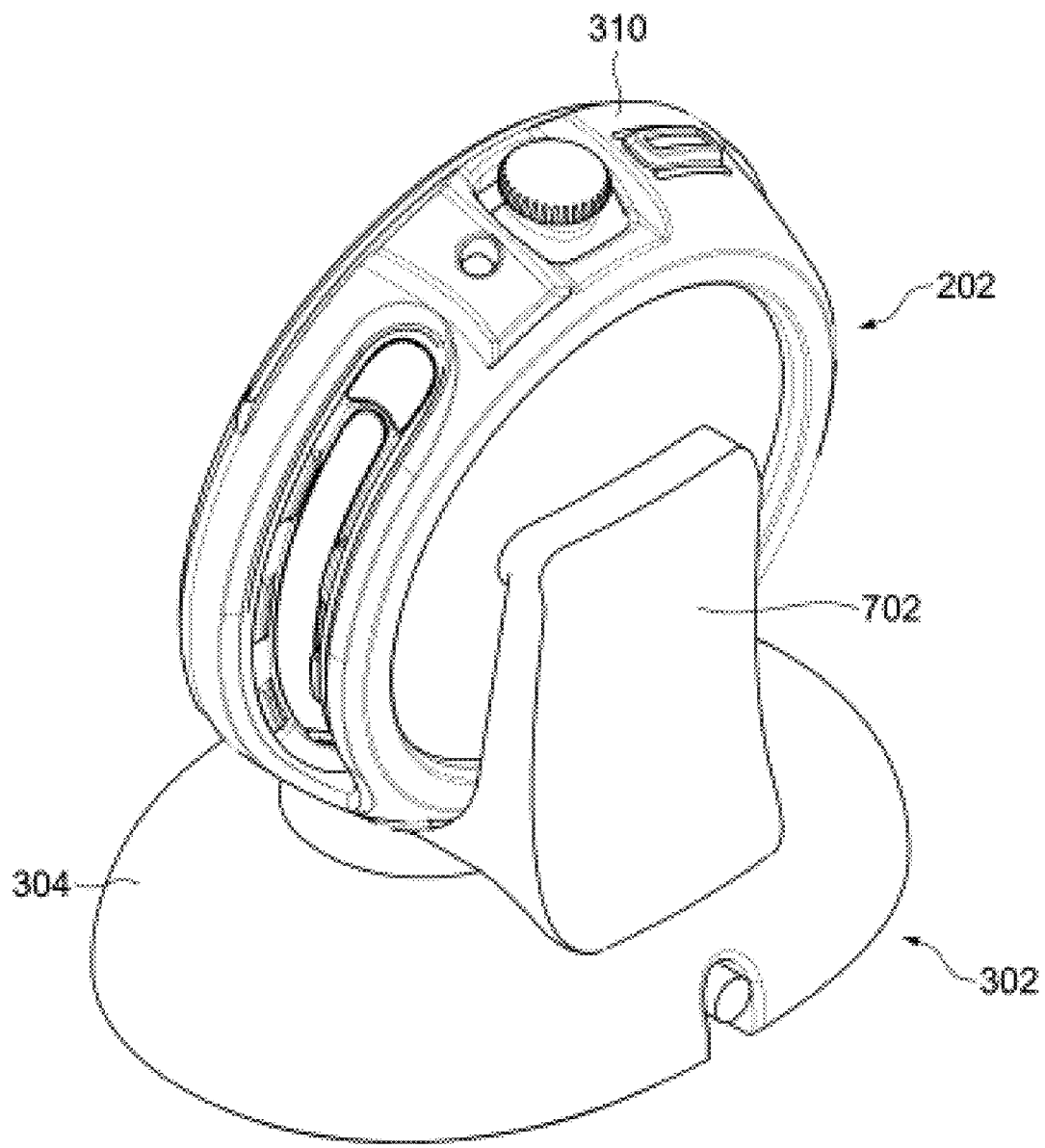

FIGS. 7A and 7B illustrate perspective views of the charging stand apparatus 302 of FIGS. 3A, 3B and 3C with another vertical support 702 formed on its housing 304 to support the smart watch 202 of FIGS. 2A and 2B enclosed in the protective case 310 for charging thereof, according to one embodiment of the present disclosure. According to one embodiment, as illustrated in FIGS. 7A and 7B, the vertical support 702 of a height surpassing half the diameter of the smart watch 202 is formed to support the smart watch 202 during its charging. That is, the vertical support 702 may be used to prevent the smart watch 202 from falling off the charging stand apparatus 302 when the smart watch 202 enclosed in the protective case 310 stands on the charging stand apparatus 302 during the charging operation.

In another embodiment, the vertical support 702 is used to support the smart watch 202 of FIGS. 2A and 2B without the protective case 310 on it during its charging operation. That is, the charging stand apparatus 302 in one embodiment of the present disclosure comprises the housing 304, the protrusion 306 and the one or more extension connectors 308 (e.g., two extension connectors), where the charging stand apparatus 302 of FIG. 3A engages with the smart watch 202 of FIGS. 2A and 2B, without wearing any protective case, during the charging operation. It is appreciated that the one or more extension connectors 308, which are made of an electrical conductor, may facilitate transmission of data, power, or both between the smart watch 202 and the low power charging system 208. The protrusion 306 is formed on the housing 304 of the charging stand apparatus 302 to secure an electrical connection with the one or more connectors 216 of the low power charging system 208.

Figure 8A:
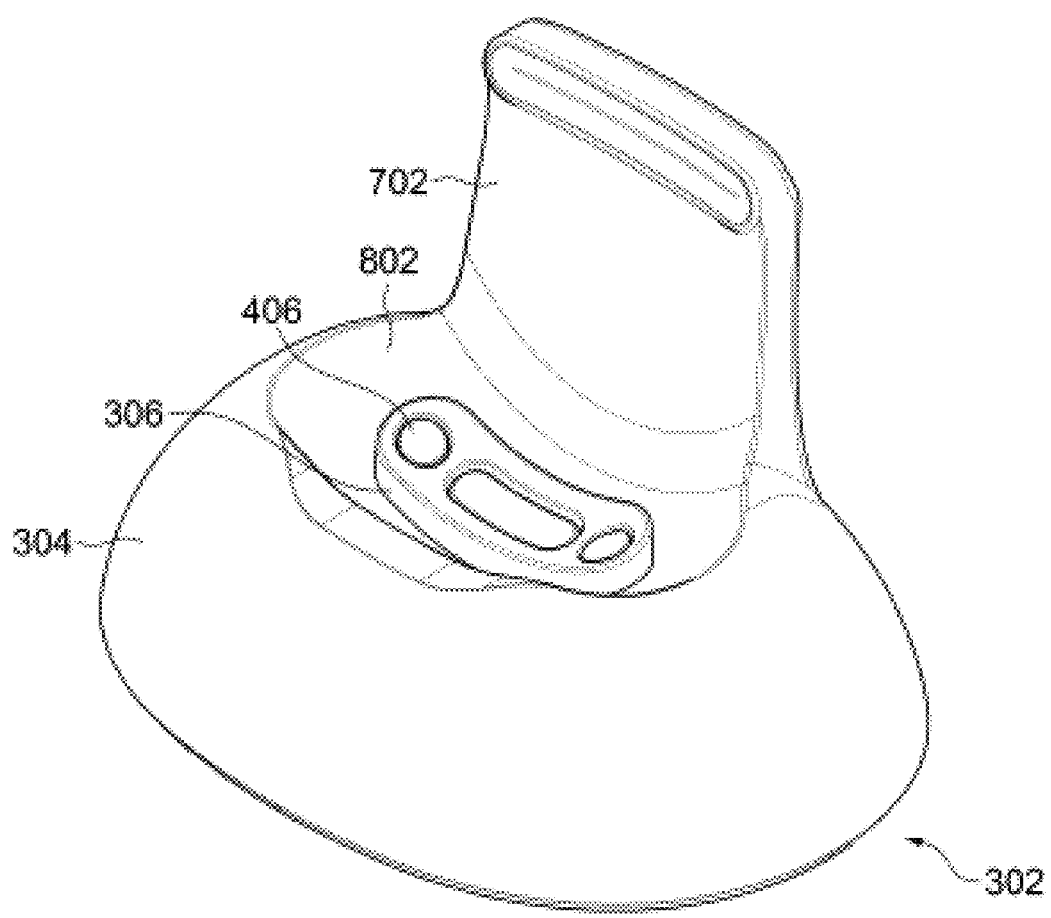
FIGS. 8A and 8B illustrate perspective views of the charging stand apparatus of FIGS. 3A, 3B and 3C with a concave depression formed on its housing to support the smart watch of FIGS. 2A and 2B enclosed in the protective cover for charging thereof, according to one embodiment of the present disclosure.
Figure 8B:
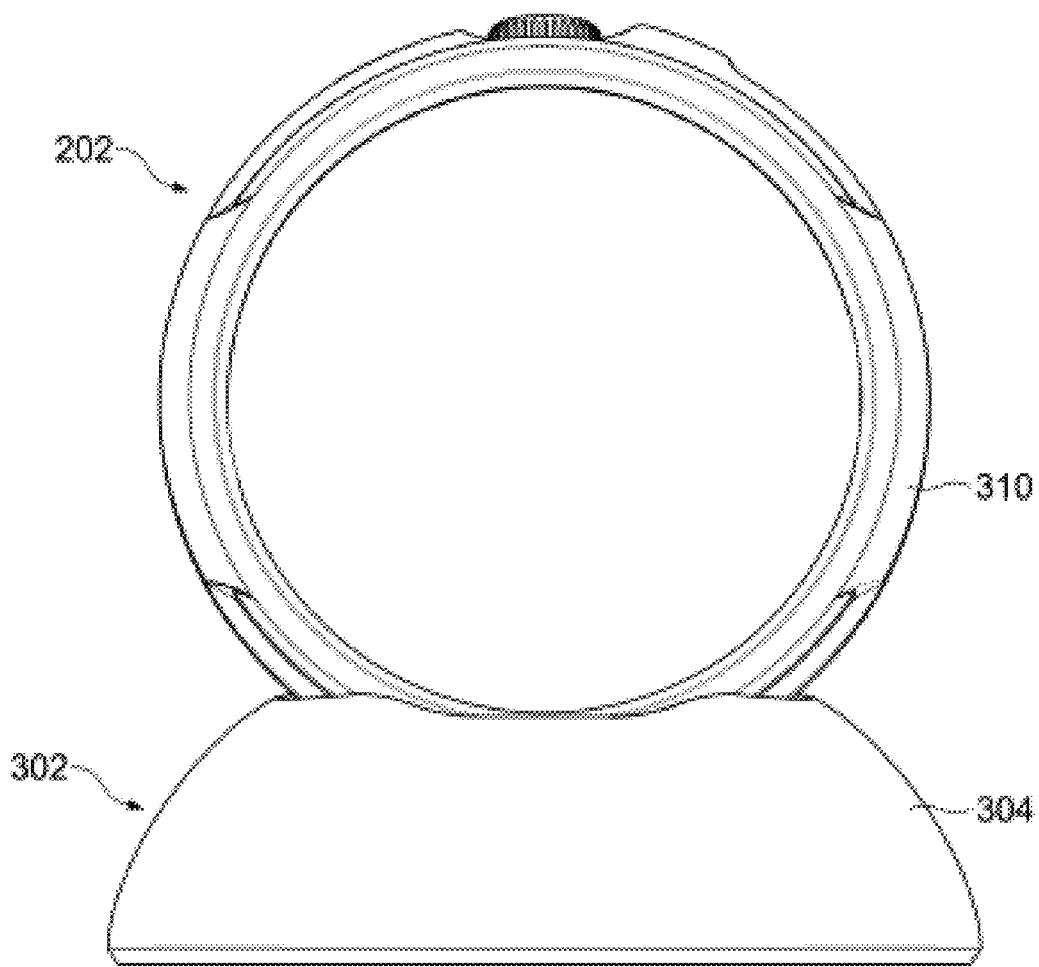

FIGS. 8A and 8B illustrate perspective views of the charging stand apparatus 302 of FIGS. 3A, 3B and 3C with a concave depression 802 formed on its housing 304 to support the smart watch 202 of FIGS. 2A and 2B enclosed in the protective case 310 for charging thereof, according to one embodiment of the present disclosure. In FIG. 8A, the concave depression 802 may be formed on the top of the housing 304 to stably support the smart watch 202 equipped with the protective case 310 while the smart watch 202 is being charged, according to one example embodiment. In addition to the vertical support 702, the concave depression 802 is used to prevent the smart watch 202 from falling off the charging stand apparatus 302 during the charging operation. FIG. 8B illustrates the smart watch 202 wearing the protective case 310 stably settled on the housing 304 of the charging stand apparatus 302 during the charging operation.

According to another embodiment, a charging apparatus for charging the smart watch 202 enclosed in the protective case 310 comprises the housing 304, a low power charging cable (e.g., the cable 212), and the at least one electrical contact 406 formed on top of the housing 304 to electrically couple with the low power charging cable for charging the smart watch and to electrically couple with at least one side connector 206 of the rechargeable battery unit of the smart watch 202 formed on the case 204 of the smart watch 202 during the charging.

In one example embodiment, the low power charging cable includes a USB Type-C fast charging cable with one end thereof is a USB-C port configured to couple with an adapter or computer and the other end thereof comprises at least one connector configured to electrically couple with the at least one electrical contact 406. That is, the low power charging cable according to the embodiment may not be detached from the charging apparatus at the user's will but may be a permanent and/or fixed part of the charging apparatus. In one example embodiment, the housing 304 comprises the protrusion 306 formed on the top surface of the housing 304, where the at least one electrical contact 406 is formed on the protrusion 306. In addition, the charging apparatus comprises the vertical support 702 formed on the top surface of the housing 304 to support the smart watch 202 during the charging.

It is appreciated that the internal components of the charging apparatus may include various electrical wires and/or circuit boards that provide operative connections from the power source (e.g., a computer port, a power adapter, etc.) to the various charging surfaces and electrical charging contacts associated with the charging apparatus.

Figure 9:
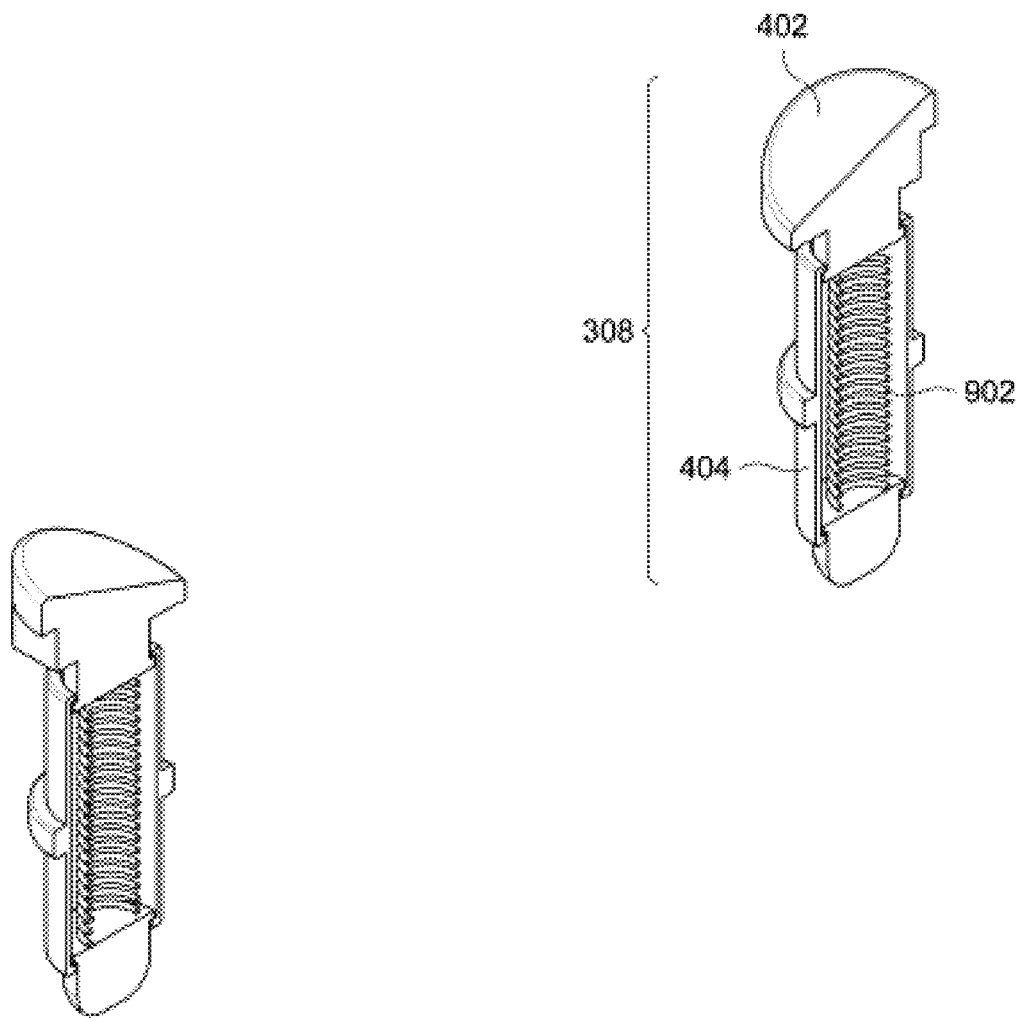
FIG. 9 illustrates an exploded view of an extension connector of the charging stand apparatus of FIGS. 3A, 3B and 3C, according to one embodiment of the present disclosure.

FIG. 9 illustrates an exploded view of the extension connector 308 of the charging stand apparatus 302 of FIGS. 3A, 3B and 3C, according to one embodiment of the present disclosure. In one embodiment, the at least one extension connector 308 comprises the pogo pin 404. Additionally, the at least one extension connector 308 comprises the contact surface 402 for providing a stable contact between the pogo pin 404 and the at least one side connector 206 of the smart watch 202 during the charging. Furthermore, the at least one extension connector 308 comprises a spring mechanism 902 (e.g., or another resilient member) installed within the pogo pin 404 to enhance a contact between the at least one connector 216 of the low power charging system 208 and the at least one side connector 206 of the rechargeable battery unit of the smart watch 202 through the at least one extension connector 308. According to one example embodiment, the at least one extension connector 308 comprises two extension connectors, as illustrated in FIG. 9.

Figure 10A:
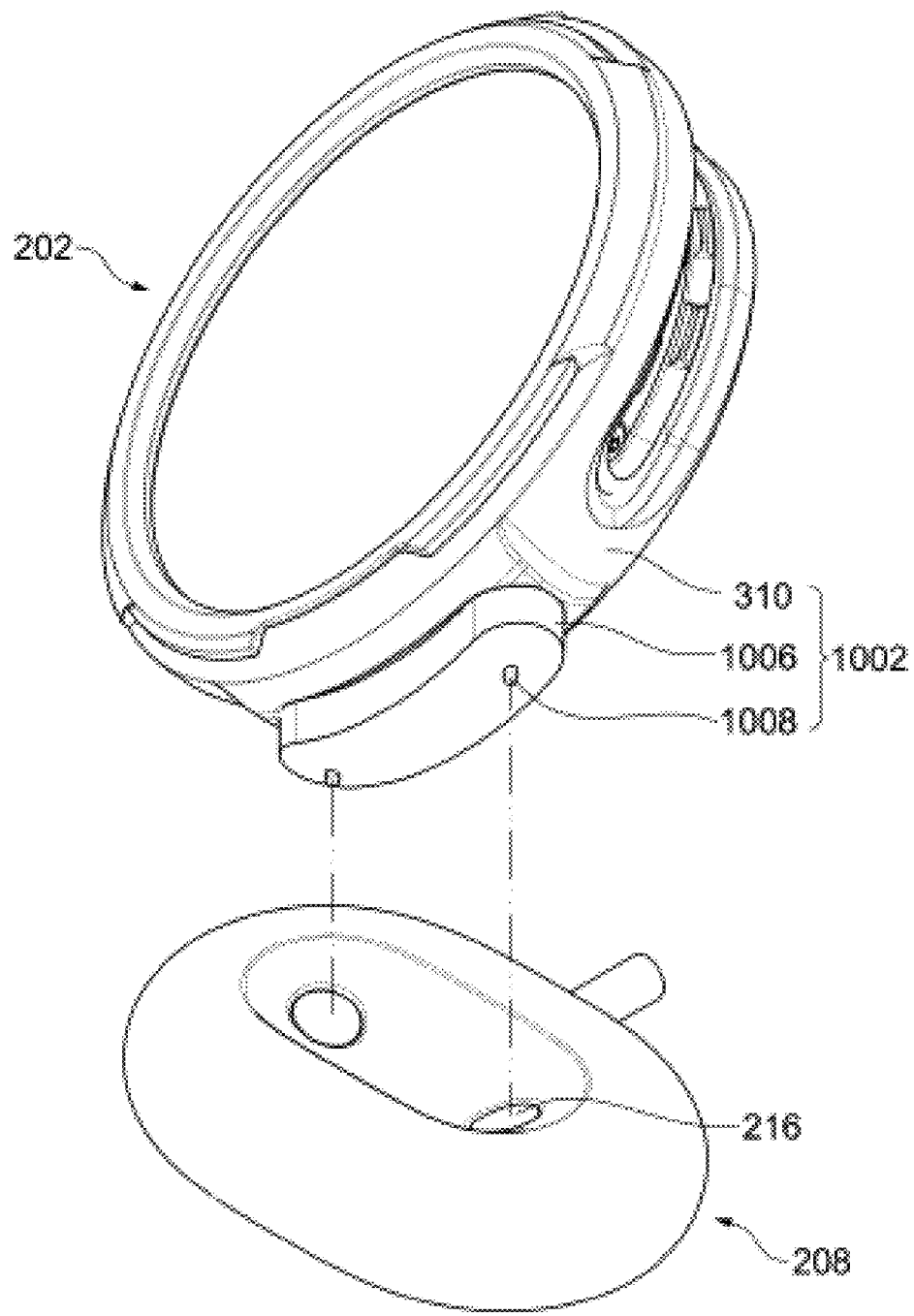
FIGS. 10A and 10B illustrate perspective views of a protective charging case for charging the smart watch, where the protective charging case is configured to engage with the low power charging system for charging the smart watch, according to one embodiment of the present disclosure.
Figure 10B:
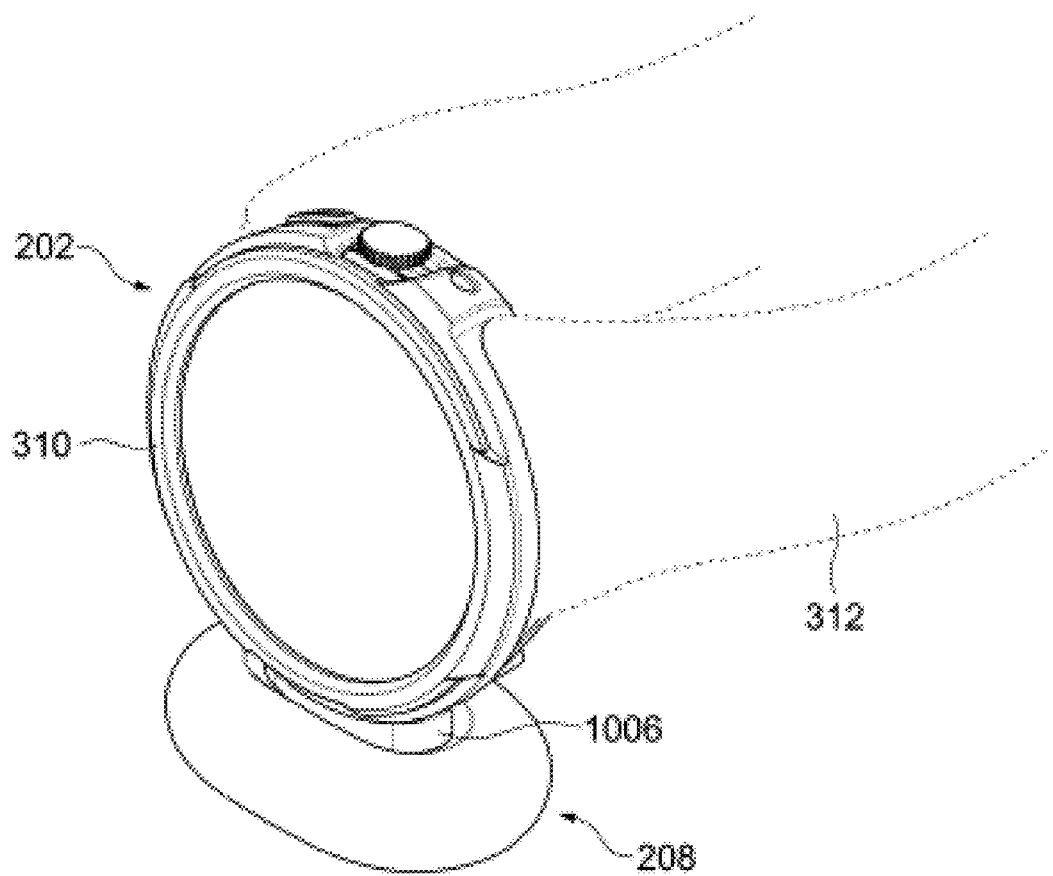

FIGS. 10A and 10B illustrate perspective views of a protective charging case 1002 for charging the smart watch 202, where the protective charging case 1002 is configured to engage with the low power charging system 208 for charging the smart watch 202, according to one embodiment of the present disclosure. In FIG. 10A, the protective charging case 1002 for the smart watch 202 comprises the protective case 310 of the smart watch 202, a protrusion portion 1006 integrally formed on the protective case 310 of the smart watch 202 and at least one extension connector 1008 formed in the protrusion portion 1006 to electrically couple with the at least one connector 216 of the low power charging system 208 for charging the smart watch 202 at a first end of the at least one extension connector 1008 and to electrically couple with the at least one side connector 206 of the rechargeable battery unit of the smart watch 202 at a second end of the at least one extension connector 1008 opposite to the first end.

In one example embodiment, the at least one extension connector 1008 comprises a pogo pin (e.g., the pogo pin 404). The at least one extension connector 1008 comprises a contact surface (e.g., the contact surface 402) for providing a stable contact between the pogo pin 404 and the at least one connector 216 of the low power charging system 208 during the charging. Furthermore, the at least one extension connector 1008 comprises two extension connectors.

The present disclosure includes multiple embodiments of charging apparatus built for electrically charging smart watches wearing their protective cases. For the convenience of the user, the charging stand apparatus of the present disclosure may provide a secure electrical connection between the smart watch being charged and the low power charging system using the structure formed to accommodate the smart watch enclosed in a protective cover or case thereof. Alternatively, the protective case itself may include a protrusion portion with at least one extension connector formed therein so that the side connector of the smart watch and the at least one connector of the low power charging system for charging the smart watch are electrically coupled through the at least one extension connector.

It is to be understood that this disclosure is not limited to particular embodiments or embodiments described, as such may vary. It is also to be understood that the terminology used herein is for the purpose of describing particular embodiments only, and is not intended to be limiting, since the scope of the present disclosure will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, representative illustrative methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present disclosure is not entitled to antedate such publication by virtue of prior disclosure. Further, the dates of publication provided may be different from the actual publication dates which may need to be independently confirmed.

It is noted that, as used herein and in the appended claims, the singular forms "a," "an," and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure. Any recited method can be carried out in the order of events recited or in any other order which is logically possible.

Although the foregoing disclosure has been described in some detail by way of illustration and example for purposes of clarity of understanding, it is readily apparent to those of ordinary skill in the art in light of the teachings of this disclosure that certain changes and modifications may be made thereto without departing from the spirit or scope of the appended claims.

Accordingly, the preceding merely illustrates the principles of the disclosure. It will be appreciated that those skilled in the art will be able to devise various arrangements which, although not explicitly described or shown herein, embody the principles of the disclosure and are included within its spirit and scope. Furthermore, all examples and conditional language recited herein are principally intended to aid the reader in understanding the principles of the disclosure and the concepts contributed by the inventors to furthering the art, and are to be construed as being without limitation to such specifically recited examples and conditions. Moreover, all statements herein reciting principles, embodiments, and embodiments of the disclosure as well as specific examples thereof, are intended to encompass both structural and functional equivalents thereof. Additionally, it is intended that such equivalents include both currently known equivalents and equivalents developed in the future, i.e., any elements developed that perform the same function, regardless of structure. The scope of the present disclosure, therefore, is not intended to be limited to the exemplary embodiments shown and described herein. Rather, the scope and spirit of present disclosure is embodied by the appended claims.

What is claimed is:

1. A charging stand apparatus for charging a smart watch enclosed in a protective cover, the charging stand apparatus comprising:
    a housing; and
    at least one extension connector formed within the housing and the at least one extension connector to electrically couple with at least one connector of a low power charging system for charging the smart watch at a first end of the at least one extension connector and to electrically couple with at least one side connector of a rechargeable battery unit of the smart watch formed on a case of the smart watch at a second end of the at least one extension connector opposite to the first end, wherein the low power charging system comprises a casing, an indentation formed on top of the casing and a cable, and wherein the at least one connector of the low power charging system is formed in the indentation.

2. The apparatus of claim 1, further comprising a protrusion formed on a top surface of the housing, wherein the second end of the at least one extension connector is formed within the protrusion.

3. The apparatus of claim 2, wherein the top surface of the housing is of a concave shape.

4. The apparatus of claim 2, further comprising a vertical support formed on the top surface of the housing to support the smart watch during the charging.

5. The apparatus of claim 2, further comprising a magnet placed underneath the protrusion to magnetically attract the at least one connector of the rechargeable battery unit of the smart watch toward the at least one extension connector.

6. The apparatus of claim 5, further comprising a nut unit including:
    a depression formed at a center of the nut unit configured to accommodate the magnet; and
    at least one hole formed on at least one side of the nut unit through which the at least one extension connector is coupled with the at least one side connector.

7. The apparatus of claim 1, wherein the low power charging system is a universal serial bus Type-C (USB-C) system.

8. The apparatus of claim 1, wherein the at least one extension connector comprises a pogo pin.

9. The apparatus of claim 8, wherein the at least one extension connector comprises a contact surface for providing a stable contact between the pogo pin and the at least one side connector during the charging.

10. The apparatus of claim 1, wherein the at least one extension connector comprises:
    a conductor pin;
    a contact surface formed at the first end; and
    a spring mechanism installed in the conductor pin to enhance a contact between the at least one connector of the low power charging system and the at least one side connector of the rechargeable battery unit of the smart watch.

11. The apparatus of claim 1, wherein the at least one extension connector comprises two extension connectors.

12. The apparatus of claim 1, further comprising an anti-slip pad to couple with a bottom of the housing.

13. A protective charging case for smart watch, comprising:
- a protective case of the smart watch;
- a protrusion portion integrally formed on the protective case; and
- at least one extension connector formed in the protrusion portion to electrically couple with at least one connector of a low power charging system for charging the smart watch at a first end of the at least one extension connector and to electrically couple with at least one side connector of a rechargeable battery unit of the smart watch at a second end of the at least one extension connector opposite to the first end.

14. The protective charging case of claim 13, wherein the at least one extension connector comprises a pogo pin.

15. The protective charging case of claim 14, wherein the at least one extension connector comprises a contact surface for providing a stable contact between the pogo pin and the at least one connector of the low power charging system during the charging.

16. The protective charging case of claim 13, wherein the at least one extension connector comprises two extension connectors.

17. A charging apparatus for charging a smart watch enclosed in a protective cover, the charging apparatus comprising:
- a housing;
- a low power charging cable; and
- at least one electrical contact formed on a top surface of the housing to electrically couple with the low power charging cable for charging the smart watch and to electrically couple with at least one side connector of a rechargeable battery unit of the smart watch formed on a case of the smart watch during the charging, wherein the top surface of the housing comprises an indentation, wherein the at least one electrical contact comprises two electrical contacts symmetrically formed in the indentation, and wherein the housing is an oval shape.

18. The apparatus of claim 17, further comprising a vertical support formed on the top surface of the housing to support the smart watch during the charging.

* * * * *